United States Patent [19]

Ramsey et al.

[11] Patent Number: 4,585,287
[45] Date of Patent: Apr. 29, 1986

[54] CABLE CONNECTOR FOR USE IN DOWNHOLE DRILLING AND LOGGING OPERATIONS

[75] Inventors: Mark S. Ramsey, Spring; James F. Miller, Houston, both of Tex.

[73] Assignee: Exxon Production Research Co., Houston, Tex.

[21] Appl. No.: 595,892

[22] Filed: Apr. 2, 1984

[51] Int. Cl.⁴ .......................................... H01R 11/00
[52] U.S. Cl. ............................. 339/60 C; 339/60 R; 339/88 R; 339/90 C; 339/94 R
[58] Field of Search ............... 339/60 R, 60 C, 60 M, 339/88 R, 89 R, 89 C, 89 M, 90 C, 91, 94, 61 R, 61 M

[56] References Cited

U.S. PATENT DOCUMENTS

| | | | |
|---|---|---|---|
| 2,273,487 | 2/1942 | Heyman | 173/322 |
| 2,290,787 | 7/1942 | Walker | 173/322 |
| 2,642,474 | 6/1953 | Bowar | 339/90 C |
| 2,701,273 | 2/1955 | Badeau | 174/138 |
| 3,014,194 | 12/1961 | Berglund | 339/75 |
| 3,034,088 | 5/1962 | Caller | 339/90 C |
| 3,617,614 | 11/1971 | Henry | 339/103 R |
| 3,694,793 | 9/1972 | Concelman | 339/91 P |
| 3,807,502 | 4/1974 | Heilhecker et al. | 339/16 |
| 3,957,118 | 5/1976 | Barry et al. | 339/117 R |
| 4,181,184 | 1/1980 | Scherbatskoy | 174/65 |
| 4,363,168 | 12/1982 | Bryer et al. | 339/117 R |
| 4,375,310 | 3/1983 | Robinson et al. | 339/88 R |

FOREIGN PATENT DOCUMENTS

| | | |
|---|---|---|
| 490013 | 8/1938 | United Kingdom . |
| 934766 | 8/1963 | United Kingdom . |
| 1016740 | 1/1966 | United Kingdom . |
| 1084283 | 9/1967 | United Kingdom . |
| 1494661 | 12/1977 | United Kingdom . |
| 1562685 | 3/1980 | United Kingdom . |

OTHER PUBLICATIONS

U.K. Patent Application No. 2,127,234A; 4-4-84; Goodman et al.
U.K. Patent Application No. 2,140,985A; 12-5-84; Billet.
European Patent Application No. 0,038,206; 10-21-81; Brownell.
Pengo Catalog; Pengo Industries; 1980; 6 pages.
Kemlon; Rubber Molded Boots & Cable Connectors; 1 page.

Primary Examiner—Gil Weidenfeld
Assistant Examiner—Paula A. Austin
Attorney, Agent, or Firm—Kenneth C. Johnson

[57] ABSTRACT

A cable connector is provided which is particularly suitable for connecting tensioned armored cable sections used in wireline measurement while drilling operations or well logging operations. The cable connector comprises a pair of field latchable housings each attached to the braided outer covering of a cable, so that cable tension is transferred to the housings. The electrical connection between the inner flexible conductor wires of the armored cables is sealed from the environment within the housing by an elastomeric boot, with the boot being loosely positioned within the housing chamber by the flexible conductor wires. The housing need not isolate the electrical connection from the drilling fluids within the drill string, and the simplicity of the cable connector enhances both reliability and drill site assembly and repair.

19 Claims, 6 Drawing Figures

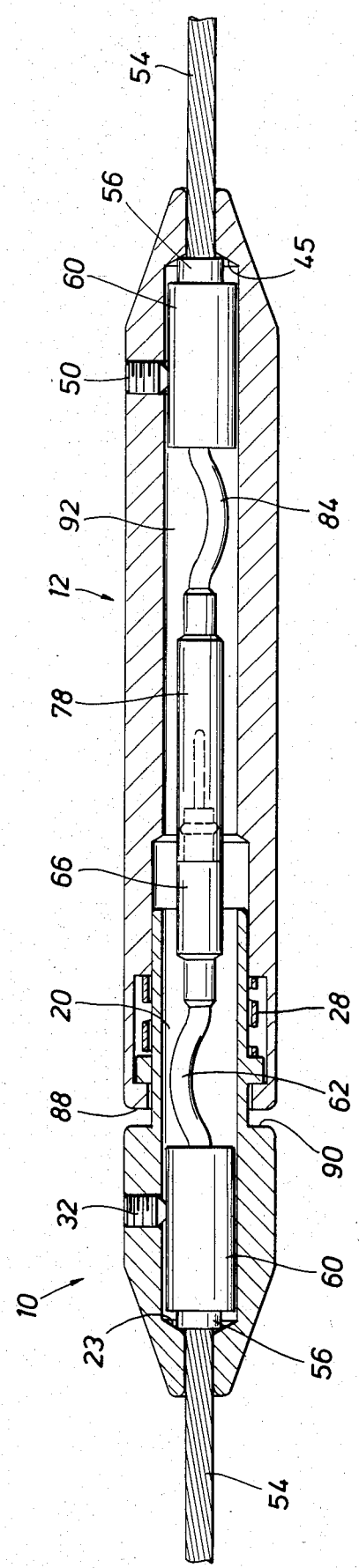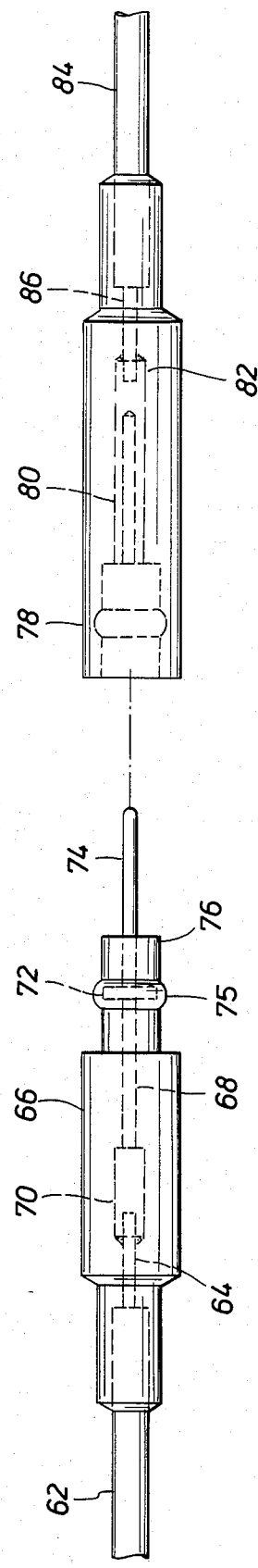

CABLE CONNECTOR FOR USE IN DOWNHOLE DRILLING AND LOGGING OPERATIONS

BACKGROUND OF THE INVENTION

The present invention concerns cable connectors for joining individual lengths of cable intended for use in hostile environments, and more particularly concerns connectors customarily used to join lengths of tensioned electromechanical cable utilized in downhole petroleum drilling and logging operations. Such cable generally comprises an inner flexible conductor wire which is surrounded by an insulating material which in turn is surrounded by an outer covering of strong braided steel wires. The braided steel wires are generally referred to as the cable's armor. It is this covering which provides the cable with excellent tensile strength characteristics.

The cable connector of the present invention is able to reliably withstand extreme temperature and pressure environments, as well as high tensile loads. The cable connector may be employed within an active drill string to connect lengths of cable utilized for transmitting data from downhole sensing equipment to surface receiving equipment in measurement while drilling operations or in well logging operations. Measurement while drilling is commonly referred to as MWD.

In well drilling operations, it is sometimes desirable to obtain information about conditions existing in and around the drill bit. MWD sensing equipment is deployed for this purpose in the drill string near the drill bit. One method of transmitting the data from this downhole sensing equipment to the surface receiving equipment is through pressure pulses in the drilling mud. Mud pulse telemetry, though generally reliable, suffers from low data transmission rates. Another method of relaying the data is via electric current flowing through cable which links the downhole sensing equipment with the surface receiving equipment. This method is capable of achieving high data transmission rates, but suffers from reliability problems. One of the most frequent causes of reliability problems is the failure of the cable connectors which are used to link multiple sections of the cable together into one continuous data link which connects the downhole sensing equipment to the surface receiving equipment. Multiple sections of cable are generally required because the cable string has to be lengthened by adding such sections as drilling progresses. This can result in many cable connectors being deployed in the hostile environment existing within the drill string. The failure of any one cable connector is generally sufficient to breach the data link.

Most prior art cable connectors are unsuitable for use in hostile environments, such as active drill strings transmitting pressurized fluids to drill bits. The cable connector described in U.S. Pat. No. 3,694,793, for example, is considered unacceptable in such an environment since the cable connector would not adequately seal the electrical conductors from the drilling fluids. In addition, such a cable connector may inadvertently come apart when downhole fluid pressure acts upon the latch-type coupling designed to release when the tabs are pressed together.

U.S. Pat. No. 4,375,310 discloses a cable connector for interconnecting lengths of armored cable used in MWD operations. The cable connector comprises an electrical contact securely mounted within each of a pair of housings, so that the electrical connection is simultaneously made with the mechanical connection as the housings are coupled together. Problems are encountered when employing this latter connector. Cable tension is transmitted to the electrical connection, and this can cause the electrical connection to separate. Also, although this cable connector seeks to provide an improved housing for sealing an internal electrical connection chamber from the external conductive drilling fluids, the protection provided by such a housing ends to deteriorate due to high temperatures, high pressures, debris on elastomeric sealing surfaces and repeated use. Each cable connector includes many components, which decreases reliability and increases the cost of manufacture. When considering the reliability and expense of such cable connectors, one must recognize that a large number of cable connectors may be required in an MWD operation and that extreme downtime expenses can be incurred to first detect and then subsequently correct a particular defective cable connector.

Cable sections are frequently cut to the desired length at the drill site and cable connectors are attached to the cable sections. A good deal of time is necessary to properly assemble and disassemble prior art cable connectors, and accordingly, expensive drilling operations may be slowed by using such cable connectors. In addition, prior art cable connectors are difficult to repair in field operations, partly because of the number and precision of the components. Finally, prior art cable connectors cannot be easily and quickly cleaned, and the electrical connection cannot be easily inspected by the operator.

The present invention overcomes the disadvantages of prior art cable connectors, and the apparatus described herein should improve the reliability and acceptability of cable connectors utilized in MWD operations. The apparatus of the present invention is also well suited for well logging operations where two or more lengths of cable must be connected together.

SUMMARY OF THE INVENTION

The present invention provides an improved cable connector for connecting lengths of cable placed in a hostile environment, such as armored electromechanical cable used in MWD and logging operations. A length of cable may be quickly and easily added to cable already deployed in the well with the cable connector of the present invention. The cable connector is sufficiently small and flexible to pass through sheave equipment used to take-up or pay-out cable, and the connector may conveniently be spooled with the cable for storage.

The apparatus of the present invention comprises a male housing and a female housing with a biased mechanical latch mechanism for easily and quickly attaching and preventing inadvertant disconnection of the housings. An electrical connection which is mechanically isolated from the housings is obtained, and an elastomeric covering seals the electrical connection from the environment. A sleeve is connected to the armored covering of each of the cables to be connected, with each sleeve engaging its respective housing for eliminating any tension in the end portion of the cable which provides the electrical connection.

As a result of the elastomeric covering which seals the electrical connection from the environment, the cable connector housing need not be sealed. The necessary mechanical connection of the tensioned outer armor portions of the cables and the electrical connection of the inner conductive portions of the cables are accomplished with separate components. The reliability of the cable connector according to the present invention is substantially increased, both by the separation of these components and by the simplicity of the overall cable connector construction and operation. The simplicity of construction further reduces cable connector fabrication costs and facilitates field repair and cleaning. The cable connector of the present invention may also be easily and quickly assembled and disassembled in the field, and is thus particularly suitable for use in measurement while drilling operations.

These and other features and advantages of the invention will become apparent from the following description, wherein reference is made to the Figures in the accompanying drawings.

BRIEF DESCRIPTION OF THE DRAWINGS

FIG. 5 is a pictorial representation of suitable male and female electrical contacts prior to assembly and their associated elastomeric boots.

FIG. 6 is a pictorial representation, partially in cross-section, of a suitable cable connector assembly according to the present invention.

DESCRIPTION OF THE PREFERRED EMBODIMENT

Figure 1:
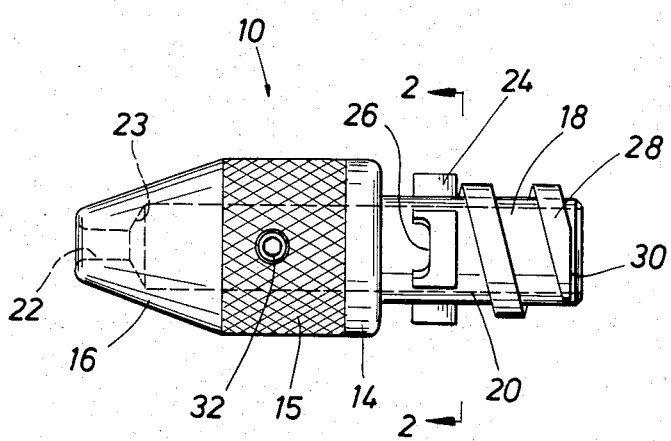
FIG. 1 is a pictorial representation of a suitable male housing according to the present invention.

The cable connector of the present invention is suitable for electrically and mechanically interconnecting armored cable, particularly braided electromechanical cable commonly used in measurement while drilling operations and in well logging operations. A typical steel braided electrically conductive cable having a nominal 3/16 inch (4.4 mm) diameter may be placed in a drill string and tensioned in excess of 1000 pounds (4400 newtons) with the cable connector of the present invention. The outer steel braids protect the inner electrical conductor wire and withstand most of the tensile forces on the cable.

Referring first to the cable connector assembly shown in FIG. 6, the cable connector of the present invention may be used to mechanically and electrically connect two lengths of cable 54. The tensile force within the cable is transferred to housings 10 and 12, which may be easily locked together and subsequently disassembled. The electrical connection of insulated conductor wires 62 and 84 is loosely positioned within electrical connection chamber 92, and is sealed from the environment within the chamber by means of elastomeric boots 66 and 78. Thus, the mechanical and electrical connections are obtained with separate components, which increases the reliability of the cable connector.

Figure 2:
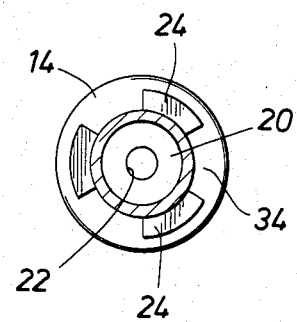
FIG. 2 is a cross-section of the apparatus depicted in FIG. 1, taken along line 2—2.

Referring to FIGS. 1 and 2, there is depicted a male housing 10 having cylindrical body 14, frusto-conical tip 16, and male portion 18 opposite tip 16. A cylindrical passageway 20 is provided through male housing 10, with a reduced diameter tip opening 22 being provided for receiving an end of a first armored cable.

Figure 3:
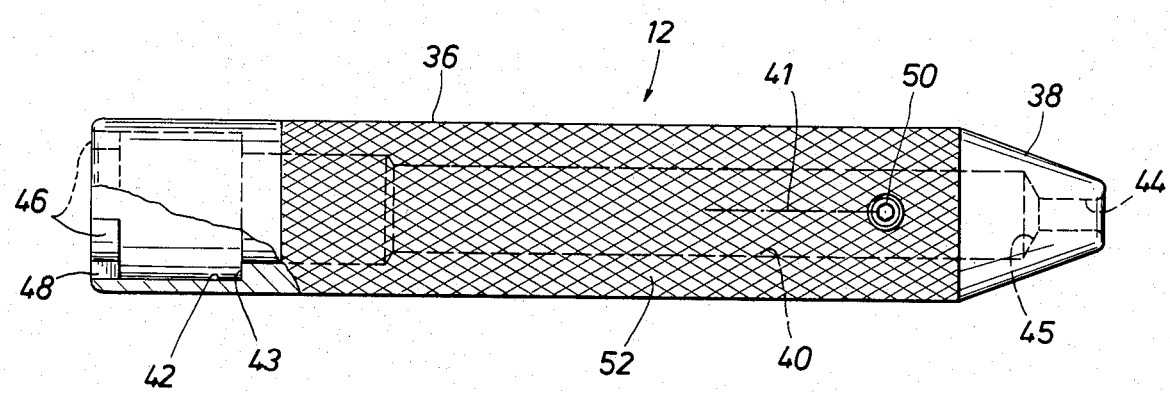
FIG. 3 is a pictorial drawing of a suitable female housing according to the present invention, with a portion of the housing removed for clarity of internal components.

FIG. 3 depicts female housing 12 having elongate cylindrical body 36 and frusto-conical tip 38. Cylindrical passageway 40 having passageway axis 41 is provided through female housing 12, with enlarged diameter opening 42 serving as a female receptacle for male portion 18 of male housing 10. A reduced diameter tip opening 44 is provided for receiving an end of a second armored cable.

The cable connector is provided with attachment means for interconnecting housings 10 and 12, and with biasing means for preventing the inadvertent disassembly of the housings. The attachment means transfers tension between the housings and thus transfers tension between the first and second armored cables. It is a feature of the present invention that housings 10 and 12 are not attached by threading, since a securely tightened threaded connection requires a fair amount of time and may inadvertently become unthreaded when the cable connectors are placed downhole. A plurality of ears 24 extend outwardly from male portion 18. These ears are intended for engagement with a plurality of teeth 46 extending inwardly from female receptacle 42 of female housing 12. Each ear 24 includes a generally U-shaped engaging surface 26, and each tooth 46 may be provided with tapered end surfaces 48 to facilitate assembly. Coil spring 28 may be tack welded to male portion 18 of male housing 10. Free flat end 30 of the spring is intended for engagement with shoulder 43 of female receptacle 42 in female housing 12.

When the male and female housings are assembled, biasing means 28 is compressed as teeth 46 pass through keyways 34 between ears 24. When end surface 88 of female housing 12 engages surface 90 of male housing 10 (see FIG. 6), spring 28 is compressed and the housings may be rotated relative to one another and released so that each tooth is in locking engagement with a U-shaped surface 26 of an ear 24. The portions of the surface adjacent the tips of the U-shaped surface serve as stops to limit rotational movement of the housings relative to each other, thereby preventing disengagement unless the spring is again compressed for intentional disassembly. As shown in FIG. 6, the assembled housings form cylindrical electrical connection chamber 92 defined by the joined first and second passageways of the male and female housings, with the axis of chamber 92 being aligned with axis 41 as shown in FIG. 3.

The passageways through each of the housings define shoulders 23 and 45 adjacent to the cable receiving openings 22 and 44 (see FIG. 6). Portions 15 and 52 of the housings may be knurled to facilitate manually grasping the housings for assembly and disassembly (see FIGS. 1 and 3). Threaded screws 32 and 50 (see FIGS. 1 and 3) are provided through the housings for engagement with sleeves 60 (see FIGS. 4 and 6), which will be described below.

Figure 4:
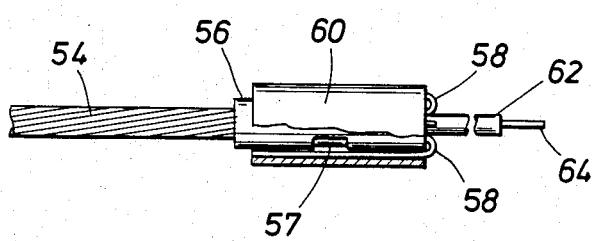
FIG. 4 is a pictorial representation of an armored cable end portion and associated apparatus for mechanically connecting the cable to a housing, with a portion of the apparatus removed for clarity.

Referring to FIGS. 4 and 6, the preferred mechanism for providing a mechanically strong connection between the armored cables and their respective housings will now be described. An end of armored cable 54 is passed through inner sleeve 56, which may be secured to the cable by crimping as shown at 57. Outer cable metal braids 58, which form the cable armor, may then be spread back over sleeve 56, leaving insulated electrical conductor wire 62 extending beyond sleeve 56. Subsequently, outer sleeve 60 may be pressed over spread back braids 58, and, if desired, sleeve 60 may also be crimped to the braids. By utilizing this technique, a mechanically strong connection can be provided between armored cable 54 and sleeve 56.

The cable/sleeve connection may be easily made up in the field after first passing the armored cable through opening 22 in male housing 10 or opening 44 in female housing 12. Thereafter, armored cable 54 may be manually pulled back through the housing until the end of inner sleeve 56 is in engagement with shoulder 23 of male housing 10 or shoulder 45 of female housing 12. As described subsequently, a fluid tight seal need not be provided between the cables and the cable openings in the housings, and the diameter of the cable opening need only be controlled so that shoulders 23 and 45 provide a stop to limit axial movement of the cables with respect to the housings when the cables are subsequently tensioned.

Since the cable connector of the present invention is designed for use with a tensioned cable, sleeve 56 within the connector assembly need not be fixed relative to its respective housing. However, if desired, a loose connection between sleeves 56 and the housings may be made by engaging screws 32 and 50 with outer sleeves 60. Preferably, each sleeve 56 will be capable of tilting slightly or "floating" with respect to the assembled connector once cable 54 is tensioned. This floating sleeve concept, in conjunction with the rounding of tip ends 16 and 38, should reduce wear and damage to the cable in the area of the cable openings compared to the cable/housing connection described in U.S. Pat. No. 4,375,310.

A mechanically strong and reliable connection may thus be made between each armored cable and its respective housing to transmit all tensile forces from the outer cable armor to the housing and thus eliminate tensile forces in insulated conductor wire 62 which is contained within electrical connection chamber 92. A field-produced mechanically strong cable/sleeve connection may thus be easily made, although this connection may also be designed so that the tensile force required to pull the cable from the sleeve may be less than the tensile strength of the cable, allowing the cable to break from the cable connector rather than break at some other point along the cable's length.

The cable connector described herein is sufficiently short and the cable/housing interconnection is sufficiently flexible that the cable connector may pass through sheave equipment commonly used in MWD or logging operations to take-up or pay-out cable. Also, the cable connector of the present invention may be spooled with the cable for storage. In addition, the cable connector housing preferably has a small diameter cylindrical configuration, so that the cable connector, when placed in a drill string, will not have a major detrimental effect on the passage of drilling fluids through the drill string during MWD operations. To accomplish these objectives, the cable connector may conveniently be less than 12 inches (30.5 cm) in length, and preferably less than 10.5 inches (26.7 cm) in length. Also, the cylindrical body of the cable connector may have a diameter less than 1.5 inches (3.8 cm), and preferably less than 1.2 inches (3.1 cm).

Referring particularly to FIG. 5, the preferred mechanism for providing a reliable electrical connection will now be described. The electrical connection of the cable connector is accomplished with components not utilized in the mechanical connection described above. Insulated conductor wire 62 may first be passed through an aperture provided in elastomeric male boot 66 having protruding portion 76 at one end. The insulation may then be removed at the end of the insulated conductor wire, so that bare conductor wire 64 is exposed. Bare conductor wire 64 is conveniently soldered to male contact 68, having enlarged end portion 70 for receiving the bare conductor wire. Male contact 68 may then be pulled back through male boot 66 until lip 72 of the male contact resides in its intended enlarged opening 75 in protruding portion 76 of male boot 66. Portion 74 of the male contact extends from the male boot. Similarly, bare conductor wire 86 of insulated conductor wire 84 may be soldered to end 82 of female contact 80 housed within elastomeric female boot 78. The male and female boots may then be pressed together into an assembled boot 66/78 so that the male and female contacts, which are each electrically connected to a conductor wire, are electrically connected to each other. The assembled boot encompasses the electrical connection and provides a fluid-tight seal which can withstand a high pressure fluid environment such as found within an active drill string. The assembled boot can be said to be pressure energized, because increasing pressure merely serves to squeeze the boot more tightly to the electrical connection provided by male contact 68 and female contact 80.

The elastomeric male and female boots according to the present invention may be fabricated from various elastomeric dielectric materials which will provide the desired fluid-tight seal between female boot 78 and protruding portion 76 of male boot 66, and also provide a fluid-tight seal between the male and female boots and insulated conductor wires 62 and 84, respectively. Preferably, the internal surface configuration of the assembled boot substantially conforms to the exterior surface configuration of the mated contacts, so that only minute voids exist between these surfaces when the electrical connection is complete. This feature enables the assembled boot to provide the desired fluid-tight seal to maintain electrical integrity under high pressure without breaking or damaging the elastomeric seal. Suitable male and female boots and associated male and female contacts are commercially available from Kemlon Products and Development, an affiliate of Keystone Engineering Company, under the designation K-25SM and K-25SF. The assembled cable connector with assembled boot 66/78 is shown in FIG. 6.

The present invention is thus well adapted for making connections between armored electrical cables in the field. An existing length of armored cable may be connected to a newly added length of armored cable (field cut to a desired length) by passing each cable end through the restricted opening in one of the housings and forming the cable 54/sleeve 56 connection previously discussed. Thereafter, the flexible inner conductor wires 64 and 86 may be electrically connected by portion 74 of male contact 68 and female contact 80 and sealed from the environment within assembled boot 66/78. The sealed electrical connection may be placed within electrical connection chamber 92 of the cable connector, and the armored cables may be pulled back through their respective housings 10 and 12 until sleeves 56 engage shoulders 23 and 45. Thereafter, the housings may be locked together with the spring biased attachment means described above. If desired, outer sleeves 60 may be loosely attached to their respective housings by screws 32 and 50 and thus be held in place until the cable is tensioned.

The assembled boot and the electrical connection made by mating portion 74 of male contact 68 with female contact 80 are mechanically connected to the cable connector housing (comprising both the male housing and the female housing) only through flexible insulated conductor wires 62 and 84, which serve no mechanical cable interconnect function. Each sleeve 56 may be crimped to its respective armored cable 54 prior to making the electrical connection, and the effective length of the entire conductor within electrical connection chamber 92 (the effective length including insulated conductor wires 62 and 84, bare conductor wires 64 and 86, and mated contacts 68 and 80) will preferably be longer than the length of the chamber. The excess length of the conductor may be easily bent and placed within the chamber. There should be sufficient slack in the conductor within the chamber 92 so that no cable tensile forces will be transmitted to the electrical connection. The electrical connection and the assembled boot are thus freely movable within the chamber.

The cable connector of the present invention may be used for connecting electrically conductive armored cable of various diameters, with the cable having either single or multiple conductor wires, and may also be used for connecting fiber optic armored cable. The same components may be used for both single and multiple conductor wire cables, with a simple change in the commercially available electrical contacts and boots.

The simplicity of the assembly according to the present invention and the reduction of precision components substantially enhances field operation and repair. Moreover, the cost of manufacturing cable connectors is reduced, especially since housings 10 and 12 may be utilized for various types of cables. The other components of the cable connector are commercially available at relatively little expense.

Prior art cable connectors having seals on the housings for forming a sealed inner chamber frequently experience assembly and/or electrical connection integrity problems because of obstruction of the seals by debris which accumulates when repeatedly assembling and dissembling the cable connector in field operations. Also, due to the difference in pressure between the interior and exterior of the sealed chamber, the seals are subject to failure. The present invention is not subject to these problems since no sealed interconnection of the male and female housings is required.

The various components of the cable connector according to the present invention may be easily cleaned at the job site, since all components in electrical connection chamber 92 may be easily removed from both the male and female disassembled housings. When assembling the cable connector, elastomeric male boot 60 and male contact 68 may be provided on the conductor wire extending through male housing 10. The male housing may then be installed on the top end of a first section of cable so that male portion 18 of the male housing will face upward in the well. Elastomeric female boot 78 and female contact 80 may likewise be provided on the conductor wire extending through female housing 12, and the female housing may then be installed on the bottom end of a second section of cable so that female receptacle 42 of the female housing will face downward in the well. This arrangement is desirable since the mechanical and electrical male members are easier to clean than the cup-shaped female members. Upward facing members tend to get dirtier in the well than downward facing members.

The male and female housings of the cable connector may be fabricated from aluminum or steel and designed to withstand at least 2000 pounds (8800 newtons), or preferably at least 4000 pounds (17,600 newtons) of axial tension without breaking. The sleeves may be cut to the desired length from commercially available metal stock. The male and female boots may be fabricated from various dielectric elastomeric materials, such as neoprene. Other embodiments for manually coupling the male and female housings are contemplated by the present invention, such as a spring-biased coupling commonly used in hydraulic fluid connection operations.

Armored cable as used herein refers to cable having an inner conductor and an exterior protective covering, and specifically includes cable referred to as electromechanical logging cable. As previously noted, the outer armor portion of such cable may be a braided metallic covering which withstands the tensile forces in the cable. Such tensile forces may be substantially greater than indicated above or, in some circumstances, may be created merely by the weight of the cable itself and may be less than 1000 pounds (4400 newtons).

It should be apparent from the foregoing that many other variations and modifications of the apparatus described herein may be made without departing from the concepts of the present invention. Accordingly, it should be understood that the forms of the invention described herein are exemplary only and that many other embodiments fall within the scope of this invention.

What is claimed is:

1. A cable connector for connecting ends of first and second cables each having an inner flexible conductor and an outer covering which provides tensile strength to said cables, said cable connector comprising:
    (a) a first housing having a male portion and a first through passageway forming a first aperture for receiving said first cable;
    (b) a second housing having a female portion for receiving said male portion and having a second through passageway forming a second aperture for receiving said second cable;
    (c) attachment means for interconnecting said first and second housings;
    (d) biasing means for preventing inadvertent disengagement of said first and said second housings;
    (e) said first and second passageways defining an elongate conductor connection chamber having a central longitudinal chamber axis;
    (f) contact means positioned within said connection chamber for connecting said inner flexible conductors of said first and second cables;
    (g) an elastomeric boot encompassing said contact means for sealing said conductor connection from the environment within said connection chamber; and
    (h) first and second securing means each connected to said first and said second cables, respectively, for engaging said first and second housings, respectively, and preventing tensile forces imposed on said cables from being transmitted to said inner flexible conductors positioned within said connection chamber, whereby said first and second securing means are both radially movable within said connection chamber.

2. A cable connector as defined in claim 1, wherein said connection chamber within said cable conductor is in fluid communication with the environment exterior to said cable conductor.

3. A cable connector as defined in claim 1, wherein said inner flexible conductors of said first and second cables are optically conductive.

4. A cable connector as defined in claim 1, wherein said cable connector can withstand a tension in excess of 2000 pounds placed across said cable connector.

5. A cable connector as defined in claim 1, wherein said elastomeric boot is mechanically disconnected from said connection chamber.

6. A cable connector as defined in claim 5, wherein the effective length of said inner flexible conductors within said connection chamber is longer than said connection chamber.

7. The apparatus as defined in claim 6, wherein the position of said elastomeric boot within said connection chamber is responsive to the position of said inner flexible conductors within said chamber.

8. A cable connector as defined in claim 1, wherein said first and second securing means each comprises:
an inner sleeve affixed to and surrounding said outer covering and having an end portion for engagement with a portion of said housing adjacent said cable receiving aperture; and
an outer sleeve surrounding said inner sleeve and retaining ends of said outer covering extending from said inner sleeve in fixed engagement with said inner sleeve.

9. A cable connector as defined in claim 8, wherein said first and second securing means are positioned within said connection chamber, wherein said outer covering of said first and second cables is a braided metallic covering, and wherein said inner flexible conductors of said first and second cables are electrically conductive.

10. A cable connector as defined in claim 1, wherein said attachment means comprises:
a plurality of ears extending outwardly from said male portion of said first housing; and
a plurality of teeth extending inwardly from said female portion of said second housing for securing engagement with said ears.

11. A cable connector as defined in claim 10, wherein:
said biasing means comprises a spring for biasing said teeth into engagement with said ears and preventing inadvertent disengagement of said first and second housings.

12. A cable connector as defined in claim 1, wherein said inner flexible conductors of said first and second cables are electrically conductive.

13. A cable connector as defined in claim 12, wherein said elastomeric boot comprises:
an elastomeric male boot member having a male portion and a through passageway defining an opening for receiving one of said inner flexible electrical conductors; and
an elastomeric female boot member having a female portion for receiving said male member and having a through passageway defining an opening for receiving another of said inner flexible electrical conductors.

14. A cable connector as defined in claim 13, wherein said contact means comprises:
a male electrical contact interconnected with said one of said inner flexible electrical conductors and being at least partially housed within said male boot; and
a female electrical contact interconnected with said another of said inner flexible electrical conductors and being at least partially housed within said female boot, said male and female electrical contacts being adapted to be mated together and thereby provide an electrical connection between said inner flexible electrical conductors of said first and second cables.

15. A cable connector as defined in claim 14, wherein the interior configuration of said elastomeric boot substantially conforms to the exterior configuration of said mated male and female electrical contacts.

16. A cable connector as defined in claim 14, wherein said male electrical contact is electrically connected to said first cable, and wherein said female electrical contact is electrically connected to said second cable.

17. A cable connector as defined in claim 1, wherein said male housing and said female housing each have a generally cylindrical exterior wall configuration.

18. A cable connector as defined in claim 17, wherein said cable connector has a length less than 10.5 inches and a diameter less than 1.2 inches.

19. A cable connector for connecting ends of first and second cables each having an inner flexible electrical conductor and an outer braided metallic covering, said cable connector comprising:
(a) a first generally cylindrical housing having a male portion and a first through passageway forming a first aperture for receiving said first cable;
(b) a second generally cylindrical housing having a female portion for receiving said male portion and having a through passageway forming a second aperture for receiving said second cable;
(c) attachment means for interconnecting said first and said second housings, including a plurality of ears extending outwardly from said male portion and a plurality of teeth extending inwardly from said female portion for securing engagement with said plurality of ears;
(d) a spring for biasing said teeth into engagement with said ears and preventing inadvertent disengagement of said first and said second housings;
(e) said first and said second passageways defining an elongate electrical connection chamber having a central longitudinal chamber axis;
(f) an electrical connection positioned within said connection chamber, including a male electrical contact interconnected with one of said electrical conductors and a female electrical contact interconnected with another of said electrical conductors, said male and female electrical contacts being releasably mated to form said electrical connection;
(g) an elastomeric boot axially and radially positionable within said connection chamber and encompassing said electrical connection for sealng said electrical connection from the environment within said connection chamber, including a male elastomeric boot member having a through passageway defining an opening for receiving said male electrical contact and a female elastomeric boot member for receiving said male elastomeric boot member and having a through passageway defining an opening for receiving said female electrical contact, the interior configuration of said elastomeric boot substantially conforming to the exterior configuration of said electrical connection; and
(h) first and second securing means each connected to said first and second cables, respectively, for engaging said first and second housings, respectively, and eliminating tensile forces in said electrical connection position within said connection chamber, each of said first and second securing means including an inner sleeve affixed to and surrounding said outer braided covering and having an end portion for engagement with a portion of said housing adjacent said cable receiving aperture, and an outer sleeve surrounding said inner sleeve and retaining ends of said braided covering extending from said inner sleeve in fixed engagement with said inner sleeve, wherein said inner sleeves are both radially movable within said connection chamber.

* * * * *